US008908859B2

(12) United States Patent
Fujisaki

(10) Patent No.: US 8,908,859 B2
(45) Date of Patent: Dec. 9, 2014

(54) CRYPTOGRAPHIC APPARATUS AND MEMORY SYSTEM

(75) Inventor: Koichi Fujisaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 13/037,710

(22) Filed: Mar. 1, 2011

(65) Prior Publication Data
US 2012/0069993 A1   Mar. 22, 2012

(30) Foreign Application Priority Data

Sep. 22, 2010   (JP) ................................. 2010-211727

(51) Int. Cl.
*G06F 21/00* (2013.01)
*H04L 9/06* (2006.01)

(52) U.S. Cl.
CPC ......... H04L 9/0637 (2013.01); *H04L 2209/125* (2013.01)
USPC ................... 380/28; 380/29; 380/37; 380/42; 380/252; 380/255; 380/259; 380/277; 713/189; 713/193; 726/28; 726/29

(58) Field of Classification Search
CPC .................... H04L 9/0637; H04L 2209/125
USPC ......... 380/28, 29, 37, 42, 255, 252, 259, 277; 713/167, 189, 193; 726/28, 29
See application file for complete search history.

(56) References Cited

U.S. PATENT DOCUMENTS

| | | | | |
|---|---|---|---|---|
| 4,731,843 | A * | 3/1988 | Holmquist | 380/29 |
| 6,125,182 | A * | 9/2000 | Satterfield | 380/28 |
| 7,110,546 | B2 * | 9/2006 | Staring | 380/260 |
| 7,809,134 | B2 * | 10/2010 | Michtchenko et al. | 380/29 |
| 8,068,610 | B2 * | 11/2011 | Moroney et al. | 380/277 |
| 8,130,952 | B2 * | 3/2012 | Shamoon et al. | 380/201 |
| 8,155,308 | B1 * | 4/2012 | Poo et al. | 380/29 |
| 8,300,805 | B1 * | 10/2012 | Langhammer | 380/28 |
| 2002/0114451 | A1 * | 8/2002 | Satterfield | 380/37 |
| 2003/0223581 | A1 * | 12/2003 | Hanounik | 380/37 |
| 2004/0131186 | A1 * | 7/2004 | Kasuya et al. | 380/255 |
| 2006/0078107 | A1 * | 4/2006 | Lee | 380/28 |

(Continued)

OTHER PUBLICATIONS

Wei Law, Yee et al. "Survery and benchmark of block ciphers for wireless sensor networks." Journal ACM Transactions on Sensor Networks (TOSN) vol. 2 Issue 1, Feb. 2006; pp. 65-93.*

(Continued)

*Primary Examiner* — Luu Pham
*Assistant Examiner* — Kari Schmidt
(74) *Attorney, Agent, or Firm* — Oblon, Spivak, McClelland, Maier & Neustadt, L.L.P.

(57) ABSTRACT

According to one embodiment, a cryptographic apparatus includes: cryptographic cores ("cores"), an assigning unit, a concatenating unit, and an output controlling unit. If a CTS flag thereof is on, each core encrypts using a symmetric key cipher algorithm utilizing CTS, while using a symmetric key. When an input of a CTS signal is received, the assigning unit assigns first input data to a predetermined core and turns on the CTS flag thereof. The concatenating unit generates concatenated data by concatenating operation data generated during encrypting the first input data, with second input data that is input immediately thereafter. The output controlling unit controls outputting the concatenated data to the predetermined core, outputting first encrypted data obtained by encrypting the concatenated data, and over outputting second encrypted data obtained by encrypting the first input data, and further turns off the predetermined core's CTS flag.

5 Claims, 7 Drawing Sheets

(56) References Cited

U.S. PATENT DOCUMENTS

2007/0003060 A1* 1/2007 Lee ............................. 380/259
2011/0123020 A1* 5/2011 Choi et al. ..................... 380/28
2011/0255689 A1* 10/2011 Bolotov et al. ................. 380/42

OTHER PUBLICATIONS

Rahman, M.A; Debnath, M.K., "An energy-efficient data security system for wireless sensor network," Computer and Information Technology, 2008. ICCIT 2008. 11th International Conference on , vol., No., pp. 381,386, Dec. 24-27, 2008.*

"IEEE Standard for Cryptographic Protection of Data on Block-Oriented Storage Devices", IEEE Computer Society, Sponsored by the Storage Systems Standards Committee and the Information Assurance Standards Committee, Apr. 18, 2008, 42 Pages.

Morris Dworkin, "Recommendation for Block Cipher Modes of Operation: The XTS-AES Mode for Confidentiality on Storage Devices", Computer Security, NIST Special Publication 800-38E, Jan. 2010, 10 Pages.

Extended European Search Report issued Feb. 23, 2012 in Patent Application No. 11176922.0.

"Full Datasheet—Fast AES XTS/CBC Core for Xilinx FPGA", Helion Technology, Retrieved from the Internet: URL:http://www.heliontech.com/downloads/aes_fast_xtscbc_xilinx_datasheet.pdf, XP-55016024, Oct. 6, 2008, pp. 1-2.

"JetXTS High Speed XTS/XEX-AES Core", Jetstream Media Technologies, Retrieved from the Internet: URL:http://www.jetsmt.com/us4s/JetXTS_1983460.pdf, XP-55016026, Dec. 31, 2006, pp. 1-4.

Mohammad Ahmed Alomari et al., "A Parallel XTS Encryption Mode of Operation", Research and Development (Scored), 2009 IEEE Student Conference on, XP-031655665, Nov. 16, 2009, pp. 172-175.

Giovanni Agosta et al., "Fast Disk Encryption Through GPGPU Acceleration", Parallel and Distributed Computing, Applications and Technologies, 2009 International Conference on, XP-031609089, Dec. 8, 2009, pp. 102-109.

U.S. Appl. No. 13/218,799, filed Aug. 26, 2011, Fujisaki.
U.S. Appl. No. 13/158,597, filed Jun. 13, 2011, Nagata, et al.

Combined Chinese Office Action and Search Report issued Oct. 30, 2013 in Patent Application No. 201110254941.4 with English Translation and English Translation of Category of Cited Documents.

Office Action issued Jul. 7, 2014 in Chinese Patent Application No. 201110254941.4 (with English Translation).

* cited by examiner

CRYPTOGRAPHIC APPARATUS AND MEMORY SYSTEM

CROSS-REFERENCE TO RELATED APPLICATIONS

This application is based upon and claims the benefit of priority from Japanese Patent Application No. 2010-211727, filed on Sep. 22, 2010; the entire contents of which are incorporated herein by reference.

FIELD

Embodiments described herein relate generally to a cryptographic apparatus and a memory system.

BACKGROUND

Symmetric block cipher is designed for the purpose of protecting electronic data. A block cipher allows encryption of a single data block of the cipher's block length. When data length is longer than the block length, the data has to be partitioned into separate cipher blocks. Thus, encryption methods that make it possible to conceal data of which the length is longer than the block length by using a symmetric block cipher encryption algorithm and encryption methods for generating an authentication code that can be used for detecting tampering of original data are developed. Such encryption methods that are useful for various applications and are based on a symmetric block cipher are called the "Block Cipher Mode of Operation".

The Block Cipher Mode of Operation "XTS", which is applied to data stored in a storage device, is disclosed in a publication by the Institute of Electrical and Electronic Engineers (IEEE) P1619-Std-2007. Further, the Block Cipher Mode of Operation disclosed in IEEE P1619-Std-2007 is adopted as SP-800-38E (the Xor-Encrypt-Xor [=XEX]-based Tweaked CodeBook mode with CTS (known as the XTS mode)) in the U.S. Government Federal Information Processing Standards (FIPS) PUB SP800-38 series that defines the Block Cipher Mode of Operation.

The symmetric key cipher is designed so as to encrypt data having the block length by performing an operation thereon. Thus, the encryption is performed on each of blocks of input data obtained by dividing encryption target data into sections each having the block length. When the length of the target data is not equal to an integral multiple of the block length, the length of the last block of partitioned data is shorter than the block length. In the XTS mode, an operation method called CipherText Stealing (CTS), which is proposed by Request for Comments (RFC) 2040, is used so as to encrypt the last data that is shorter than the block length.

According to the operation of CTS, however, a dependency relationship arises between the operation of the shorter data and the operation is performed immediately before the last data that is shorter than the block length. Thus, unless the encryption of the data having the block length is completed, the next operation on the data that is shorter than the block length cannot be started.

As a result, When blocks of input data are encrypted in parallel while using a plurality of cryptographic cores, the cryptographic core to which the data that is shorter than the block length is assigned will be in a waiting state, until the process of the cryptographic cores to which the block data are assigned are finished up the predetermined stage in CTS. In that situation, the encryption is not performed in parallel and the performance is declined.

DETAILED DESCRIPTION

In general, according to one embodiment, a cryptographic apparatus includes: a plurality of cryptographic cores, an assigning unit, a concatenating unit, and an output controlling unit. Each of the plurality of cryptographic cores includes a flag storage unit for storing therein a CipherText Stealing (CTS) flag indicating that CTS is to be performed. When the CTS flag thereof is turned on, each of the cryptographic cores encrypts using a symmetric key cipher algorithm that utilizes CTS, while using a symmetric key. When having received an input of a CTS signal indicating that second input data that is input immediately after first input data having a block length is shorter than the block length, the assigning unit assigns the first input data to one of the plurality of cryptographic cores and turns on the CTS flag of the one of the cryptographic cores to which the first input data is assigned. The concatenating unit generates concatenated data by concatenating operation data generated during encrypting the first input data at the one of the cryptographic cores and the second input data. The output controlling unit controls outputting the concatenated data to the one of the cryptographic cores, controls outputting first encrypted data obtained by encrypting the concatenated data at the one of the cryptographic cores, and controls outputting second encrypted data obtained by encrypting the first input data at the one of the cryptographic cores, and turns off the CTS flag of the one of the cryptographic cores.

A configuration of a memory system that includes a cryptographic apparatus according to an embodiment will be explained.

Figure 1:
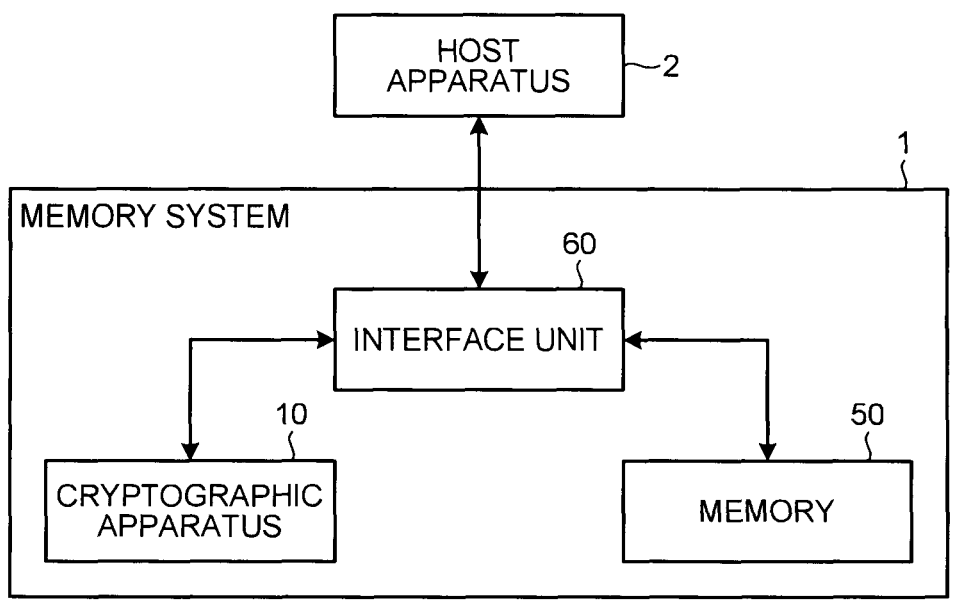
FIG. 1 is a block diagram of an exemplary configuration of a memory system according to an embodiment.

FIG. 1 is a block diagram of an exemplary configuration of a memory system 1 according to the present embodiment. The memory system 1 is constructed so as to encrypt writing target data and store encrypted writing target data, in response to a write request from a host apparatus 2 and so as to decrypt and read reading target data that is encrypted and stored, in response to a read request from the host apparatus 2. The memory system 1 may be implemented as, for example, a NAND semiconductor memory device. As shown in FIG. 1, the memory system 1 includes a cryptographic apparatus 10, a memory 50, and an interface unit 60. The host apparatus 2 is a computer that has the memory system 1 built therein or has the memory system 1 connected thereto on the outside thereof. The write request and the read request to the memory system 1 are issued by an Operating system (OS) provided in the host apparatus 2.

The cryptographic apparatus 10 is a circuit that is configured so as to encrypt the writing target data provided by the host apparatus 2 and so as to decrypt the reading target data that is encrypted and stored in the memory 50. According to the present embodiment, the writing target data and the reading target data are each input to the cryptographic apparatus 10 in units of blocks. The cryptographic apparatus 10 is configured so as to encrypt the writing target data and to decrypt the reading target data in units of blocks. The present embodiment will be explained on an assumption that a size of block is 128 bits; however, the size of block is not limited to this example. The details of the cryptographic apparatus 10 will be explained later.

The memory 50 is a nonvolatile memory that stores therein the data that is encrypted by the cryptographic apparatus 10. For example, the memory 50 may be implemented in a NAND flash memory.

The interface unit 60 is a circuit that controls the functional units included in the memory system 1 in response to a request from the host apparatus 2. Specifically, when the interface unit 60 has received a write request from the host apparatus 2 that requests writing target data to be written, the interface unit 60 partitions the writing target data and sequentially sends the block data, which is divided in the partition process, to the cryptographic apparatus 10 so as to encrypt the blocks of input data. After that, the interface unit 60 sequentially receives encrypted data obtained by encrypting the blocks of input data from the cryptographic apparatus 10 and outputs the received blocks of encrypted data to the memory 50 so as to cause the memory 50 to store therein the encrypted data. Further, when the interface unit 60 has received a read request from the host apparatus 2, the interface unit 60 reads blocks of reading target data from the memory 50 and sequentially sends the blocks of reading target data to the cryptographic apparatus 10 so as to cause the cryptographic apparatus 10 to decrypt the blocks of reading target data. After that, the interface unit 60 sequentially receives inputs of the blocks of reading target data that are decrypted from the cryptographic apparatus 10 and returns the blocks of reading target data that are decrypted to the host apparatus 2.

Figure 2:
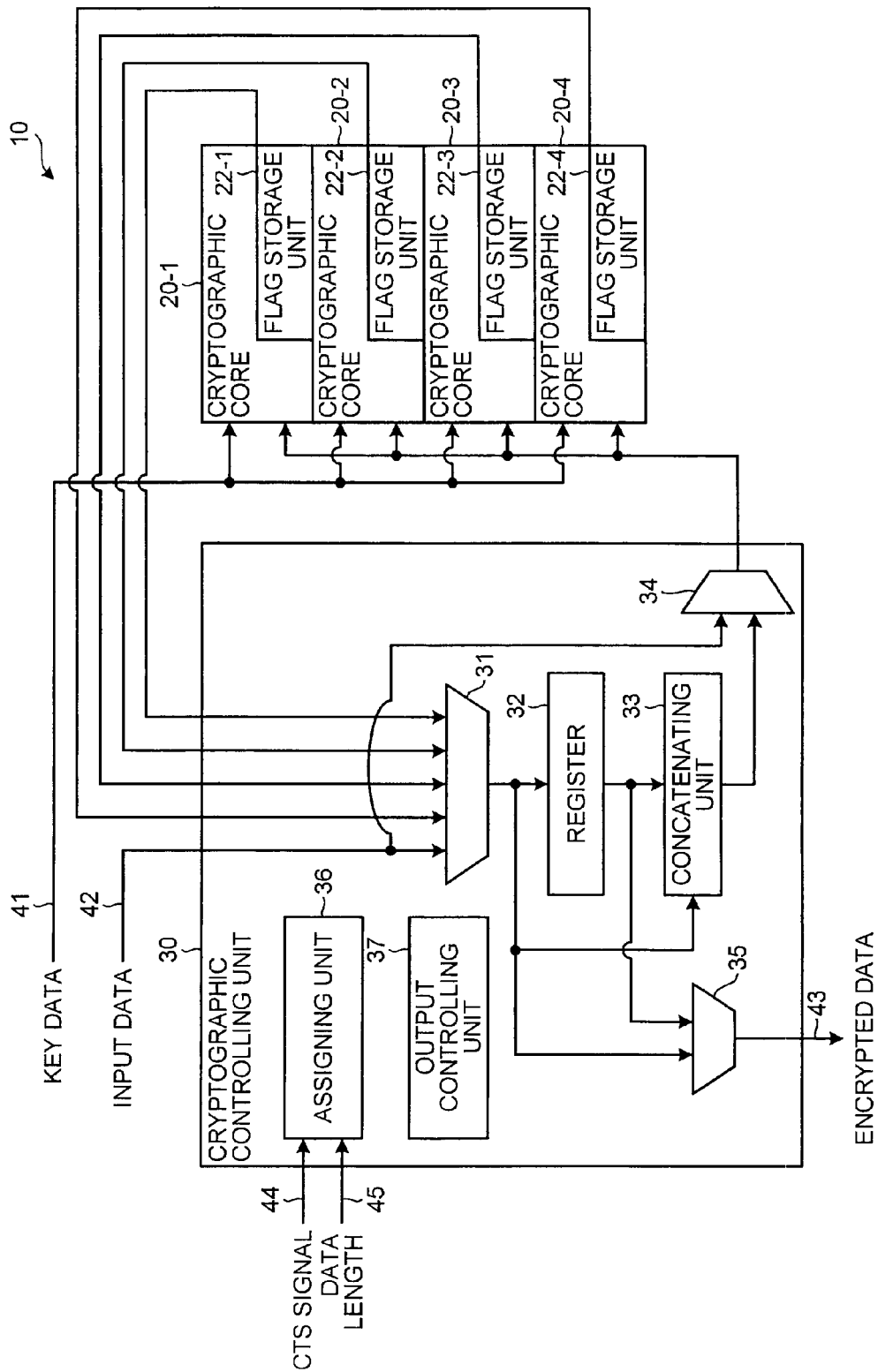
FIG. 2 is a block diagram of an exemplary configuration of a cryptographic apparatus according to the embodiment.

FIG. 2 is a block diagram of an exemplary component of the cryptographic apparatus 10 according to the present embodiment. As shown in FIG. 2, the cryptographic apparatus 10 includes cryptographic cores 20-1 to 20-4 and a cryptographic controlling unit 30. The present embodiment will be explained by using an example in which the number of cryptographic cores is four; however, the number of cryptographic cores may be any number that is equal to or larger than two. Further, in the following sections, in the situations in which the cryptographic cores 20-1 to 20-4 are not necessarily distinguished from one another, the cryptographic cores 20-1 to 20-4 may simply be referred to as the cryptographic cores 20. Also, in the example shown in FIG. 2, the lines that are connected to the functional units of the cryptographic apparatus 10 indicate data lines through which data signals are transmitted. Control lines through which control signals are transmitted are omitted from the drawing.

Each of the cryptographic cores 20-1 to 20-4 is implemented executing a symmetric key cipher algorithm and input data that is input thereto by the cryptographic controlling unit 30, while using key data that is input thereto through a key data signal line 41. Further, each of the cryptographic cores 20-1 to 20-4 is designed so as to output cipher text. In this situation, the cryptographic cores 20-1 to 20-4 are to encrypt, in parallel, the plurality of blocks of input data that are sequentially input thereto by the cryptographic controlling unit 30. The present embodiment will be explained by using an example in which the encryption method used by the cryptographic cores 20 is the XTS mode, whereas the symmetric key cipher algorithm used in the cryptographing by the cryptographic cores 20 is the Advanced Encryption Standard (AES); however, the embodiment is not limited thereto. The key data signal line 41 is connected to the interface unit 60. In other words, the key data is input to each of the cryptographic cores 20-1 to 20-4 from the interface unit 60 via the key data signal line 41.

The cryptographic cores 20-1 to 20-4 respectively include flag storage units 22-1 to 22-4 each of which stores therein a CTS flag that indicates whether CipherText Stealing (CTS) operation is to be performed. If the own CTS flag is turned off, each of the cryptographic cores 20-1 to 20-4 computes using a normal symmetric key cipher algorithm. On the contrary, if the own CTS flag is turned on, each of the cryptographic cores 20-1 to 20-4 computes using a symmetric key cipher algorithm that utilizes CTS.

The cryptographic controlling unit 30 is a circuit that is configured so as to control the cryptographic cores 20-1 to 20-4 and so as to control outputting results of the computing by the cryptographic cores 20-1 to 20-4. The cryptographic controlling unit 30 includes a selector 31, a register 32, a concatenating unit 33, another selector 34, yet another selector 35, an assigning unit 36, and an output controlling unit 37.

The selector 31 is controlled by the assigning unit 36 and the output controlling unit 37. The selector 31 is configured so as to select output destinations for input data that is input thereto through an input data signal line 42 and a computed result that is input thereto from any of the cryptographic cores 20-1 to 20-4 out of the following: the register 32, the concatenating unit 33, and the selector 35. Further, the selector 31 outputs the input data and the computed result that is input thereto to the selected output destinations. The input data signal line 42 is connected to the interface unit 60. In other words, the input data is input to the selector 31 from the interface unit 60 via the input data signal line 42. The input data that is input thereto through the input data signal line 42 is data of which the length is either equal to the block length or shorter than the block length.

The register 32 is implemented so as to store therein the input data and the computed result that is input thereto by the selector 31.

The concatenating unit 33 is a circuit that is controlled by the assigning unit 36 and the output controlling unit 37. The concatenating unit 33 is designed so as to generate concatenated data by concatenating the computed result that is input thereto by the selector 31 with the input data that is stored in the register 32.

The selector 34 is controlled by the assigning unit 36 or the output controlling unit 37. The selector 34 is designed so as to select output destinations for the input data that is input thereto through the input data signal line 42 and the concatenated data that is input thereto by the concatenating unit 33 out of the cryptographic cores 20-1 to 20-4. After that, the selector 34 outputs the input data and the concatenated data that are input thereto to the selected output destinations.

The selector 35 is controlled by the output controlling unit 37. The selector 35 is configured so as to output the computed result that is input thereto from the selector 31 and the encrypted data that is a computed result input thereto from the register 32, through an output data signal line 43. The output data signal line 43 is connected to the interface unit 60. In other words, the encrypted data is output to the interface unit 60 from the selector 35 via the output data signal line 43.

The assigning unit 36 is a circuit that is designed so as to assign the input data that is input through the input data signal line 42 to one of the cryptographic cores 20-1 to 20-4. Further, the assigning unit 36 controls the selector 34 so that the input data is output to the one of the cryptographic cores 20-1 to 20-4 to which the input data is assigned. In this situation, the assigning unit 36 sequentially assigns blocks of input data to the cryptographic cores 20-1 to 20-4 in a round-robin manner.

Further, when the assigning unit 36 receives an input of a CTS signal through a CTS signal line 44, the CTS signal indicating that a next block of input data (i.e., an example of the second input data) that is input through the input data signal line 42 immediately after a block of input data having the block length (i.e., an example of the first input data) is shorter than the block length, the assigning unit 36 assigns the input data that has the block length and that is input through the input data signal line 42 prior to the next block of input data, to one of the cryptographic cores 20-1 to 20-4. After that, the assigning unit 36 turns on the CTS flag of the one of the cryptographic cores to which the block of input data is assigned. Further, the assigning unit 36 stores the next block of input data that is input through the input data signal line 42 into the register 32, outputs the data length of the next block of input data that is input through a data length signal line 45 to the concatenating unit 33, and controls the selector 34 so that the data length of the next block of input data is output to the one of the cryptographic cores. The CTS signal line 44 and the data length signal line 45 are connected to the interface unit 60. In other words, the CTS signal is input to the assigning unit 36 from the interface unit 60 via the CTS signal line 44. The data length of the next block of input data is input to the assigning unit 36 from the interface unit 60 via the data length signal line 45.

The output controlling unit 37 is a circuit that is designed so as to, for example, control outputting a computed result that is input from any of the cryptographic cores 20. When a block of encrypted data that is a computed result that is input to the cryptographic controlling unit 30 from any of the cryptographic cores 20 of which the CTS flag is turned off, the output controlling unit 37 controls the selector 31 so that the input block of encrypted data is output to the selector 35 and is output through the output data signal line 43. When the processing by any of the cryptographic cores 20 ends, an end signal is output from the cryptographic core 20 to the output controlling unit 37. Thus, by checking the CTS flag of the cryptographic core 20 from which the end signal is output, the output controlling unit 37 checks whether it is an input from such a cryptographic core 20 of which the CTS flag is turned off.

Further, when operation data generated during encrypting the input data is input in the cryptographic controlling unit 30 from the one of the cryptographic cores described above of which the CTS flag is turned on, the output controlling unit 37 controls the selector 31 so that the input operation data is output to the concatenating unit 33, and also, causes the next block of input data stored in the register 32 to be output to the concatenating unit 33. After that, the output controlling unit 37 causes concatenated data that has been generated by the concatenating unit 33 to be output to the one of the cryptographic cores.

Further, when encrypted data (i.e., an example of a second encrypted data) obtained by computing the input data is input to the cryptographic controlling unit 30 from the one of the cryptographic cores 20, the output controlling unit 37 controls the selector 31 so that the input encrypted data is output to the register 32 and stored therein.

Further, when encrypted data (i.e., an example of a first encrypted data) obtained by computing the concatenated data is input to the cryptographic controlling unit 30 from the one of the cryptographic cores, the output controlling unit 37 controls the selector 31 so that the input encrypted data is output to the selector 35 and is output through the output data signal line 43. After that, the output controlling unit 37 causes the encrypted data stored in the register 32 to be output to the selector 35 and to be output through the output data signal line 43. The output controlling unit 37 turns off the CTS flag of the one of the cryptographic cores.

Next, operations of the cryptographic apparatus according to the present embodiment will be explained.

In the following sections, it is assumed that the writing target data for which a write request is issued by the host apparatus 2 is partitioned by the interface unit 60 into blocks of input data $P_j$ ($0 \leq j \leq m$) of which the quantity is equal to m+1 and each of which has the block length, so that the blocks of input data $P_j$ are sequentially input to the cryptographic apparatus 10 through the input data signal line 42. It is also assumed that the last block of input data $P_m$ is shorter than the block length.

Figure 3:
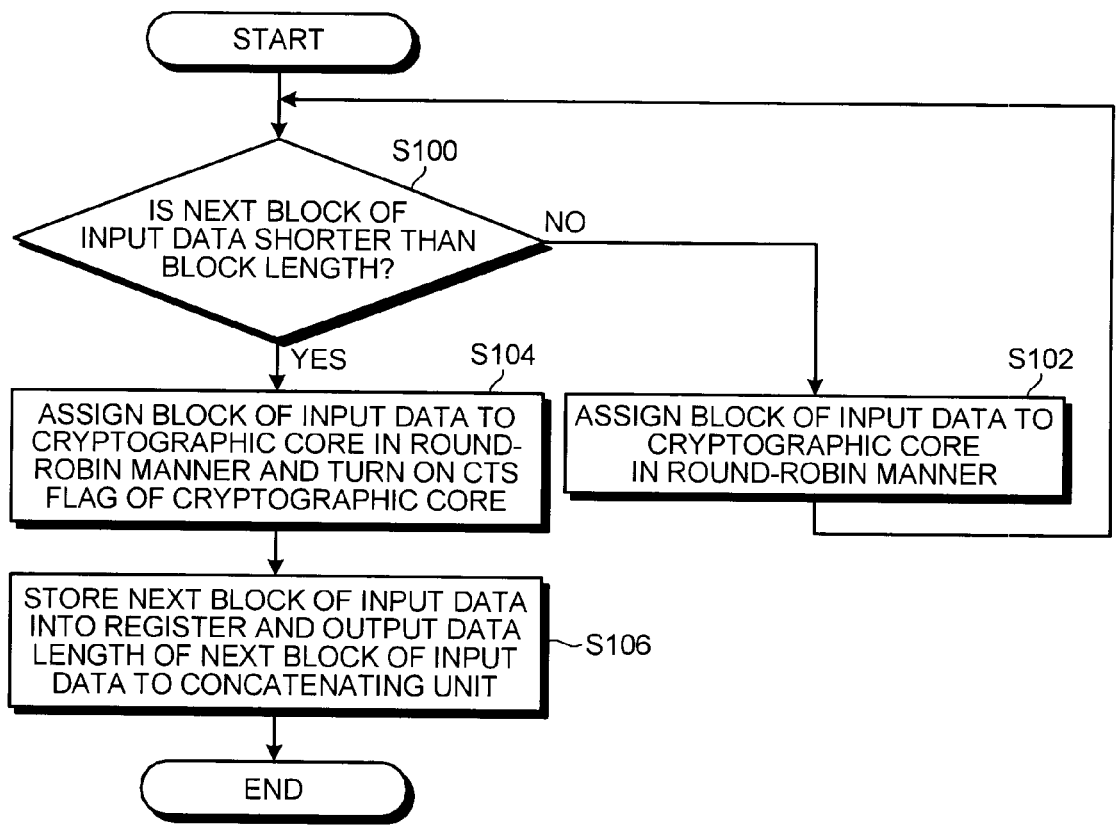
FIG. 3 is a flowchart of an example of an assigning process according to the embodiment.

FIG. 3 is a flowchart of an example of a procedure in an assigning process performed by the assigning unit 36 according to the present embodiment.

First, when no CTS signal is input thereto through the CTS signal line 44, the assigning unit 36 determines that a next block of input data expressed as $P_{j+1}$ ($0 \leq j \leq m-2$) that is the next data to be input through the input data signal line 42 has the block length (step S100: No). In this situation, the assigning unit 36 assigns a block of input data expressed as $P_j$ that is input prior to the next block of input data $P_{j+1}$ to one of the cryptographic cores 20-1 to 20-4 in a round-robin manner (step S102). After that, the process returns to step S100.

On the contrary, when a CTS signal is input thereto through the CTS signal line 44, the assigning unit 36 determines that a next block of input data expressed as $P_m$ that is the next data to be input through the input data signal line 42 is shorter than the block length (step S100: Yes). In this situation, the assigning unit 36 assigns a block of input data expressed as $P_{m-1}$ that is input prior to the next block of input data $P_m$ to one of the cryptographic cores 20-1 to 20-4 in a round-robin manner and turns on the CTS flag of the one of the cryptographic cores to which the block of input data $P_{m-1}$ is assigned (step S104). In the present example, it is assumed that the assigning unit 36 assigns the block of input data $P_{m-1}$ to the cryptographic core 20-2. In other words, it is assumed that "the one of the cryptographic cores" is the cryptographic core 20-2.

Subsequently, the assigning unit 36 stores the next block of input data $P_m$ that is input through the input data signal line 42 into the register 32, and also, outputs the data length of the next block of input data $P_m$ that is input thereto through the data length signal line 45 to the concatenating unit 33 (step S106). Further, the assigning unit 36 controls the selector 34 so that the data length of the next block of input data $P_m$ is also output to the cryptographic core 20-2. After that, the assigning unit 36 ends the process.

When the interface unit 60 has received a new write request from the host apparatus 2, a new block of input data is input through the input data signal line 42. Accordingly, the assigning unit 36 resumes the process from step S100.

Figure 4:
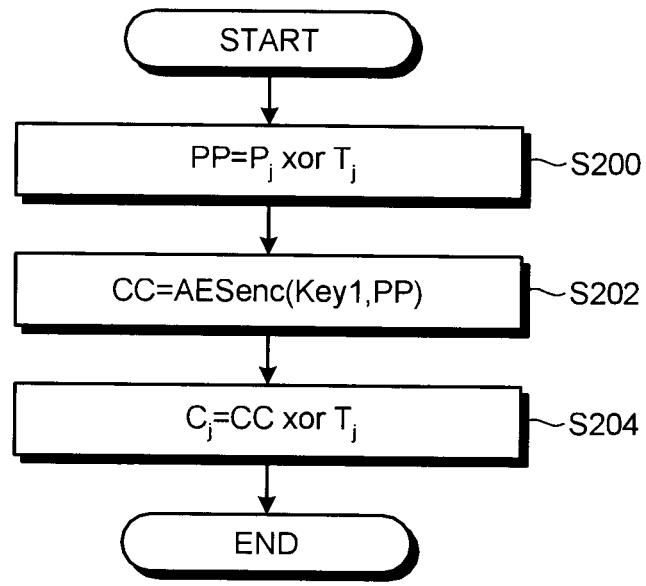
FIG. 4 is a flowchart of an example of an operation using a normal symmetric key cipher algorithm according to the embodiment.

FIG. 4 is a flowchart of an example of a procedure in an operation using a normal symmetric key cipher algorithm that is performed by any of the cryptographic cores 20 according to the present embodiment, i.e., an operation using a symmetric key cipher algorithm that does not utilize CTS. The process shown in FIG. 4 is performed by any of the cryptographic cores 20 to which the input data is assigned by the assigning unit 36 at step S102 shown in FIG. 3.

First, the cryptographic core 20 calculates an exclusive logical sum PP between a block of input data expressed as $P_j$ in a j'th block ($0 \le j \le m-2$) and a mask value $T_j$ (step S200). In this situation, when "j=0" is satisfied, the mask value $T_j$ is calculated by assigning a symmetric key Key2 and a sector number i (a Tweak Value) to Expression (1) shown below. When "$1 \le j \le m-2$" is satisfied, the mask value $T_j$ is calculated by using expression (2) shown below. In the expressions below, $\alpha^j$ denotes a primitive element in a Galois field.

$$T_0 = \text{AESenc}(\text{Key2}, i) \times \alpha^0 \tag{1}$$

$$T_j = T_{j-1} \times \alpha^{j-1} \tag{2}$$

After that, the cryptographic core 20 assigns the exclusive logical sum PP that is calculated and a symmetric key Key1 to Expression (3) below so as to calculate encrypted value CC (step S202).

$$CC = \text{AESenc}(\text{Key1}, PP) \tag{3}$$

After that, the cryptographic core 20 calculates encrypted data $C_j$, which is an exclusive logical sum between the encrypted value CC that is calculated and the mask value $T_j$ and outputs the encrypted data $C_j$ to the cryptographic controlling unit 30 (step S204).

The process shown in FIG. 4 is performed in parallel in the cryptographic cores 20-1 to 20-4.

Figure 5:
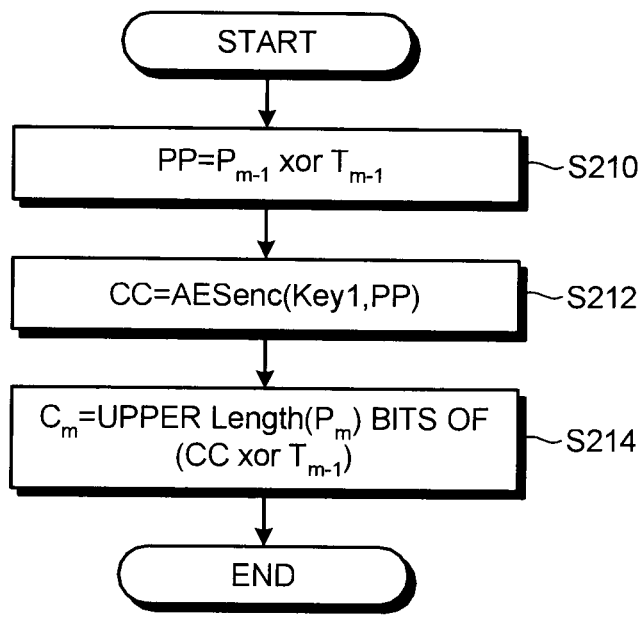
FIG. 5 is a flowchart of an example of a former stage operation using a symmetric key cipher algorithm that utilizes CTS according to the embodiment.

FIG. 5 is a flowchart of an example of a former stage operation using a symmetric key cipher algorithm that is performed by the cryptographic core 20-2 and utilizes CTS according to the present embodiment. The process shown in FIG. 5 is performed by the cryptographic core 20-2 to which the input data is assigned by the assigning unit 36 at step S104 shown in FIG. 3.

First, the cryptographic core 20-2 calculates an exclusive logical sum PP between the block of input data expressed as $P_{m-1}$ in an m−1'th block and a mask value $T_{m-1}$ (step S210). In this situation, the mask value $T_{m-1}$ is calculated by using expression (4) shown below.

$$T_{m-1} = T_{m-2} \times \alpha^{m-2} \tag{4}$$

After that, the cryptographic core 20-2 assigns the exclusive logical sum PP that is calculated and the symmetric key Key1 to Expression (3) above so as to calculate encrypted value CC and outputs the encrypted value CC to the cryptographic controlling unit 30 (step S212).

After that, to obtain encrypted data $C_m$, the cryptographic core 20-2 calculates as many upper bits of the exclusive logical sum between the encrypted value CC that is calculated and the mask value $T_{m-1}$ as the data length of the next block of input data $P_m$ and outputs the encrypted data $C_m$ to the cryptographic controlling unit 30 (step S214).

The process in the following latter stage will be explained later.

Figure 6:
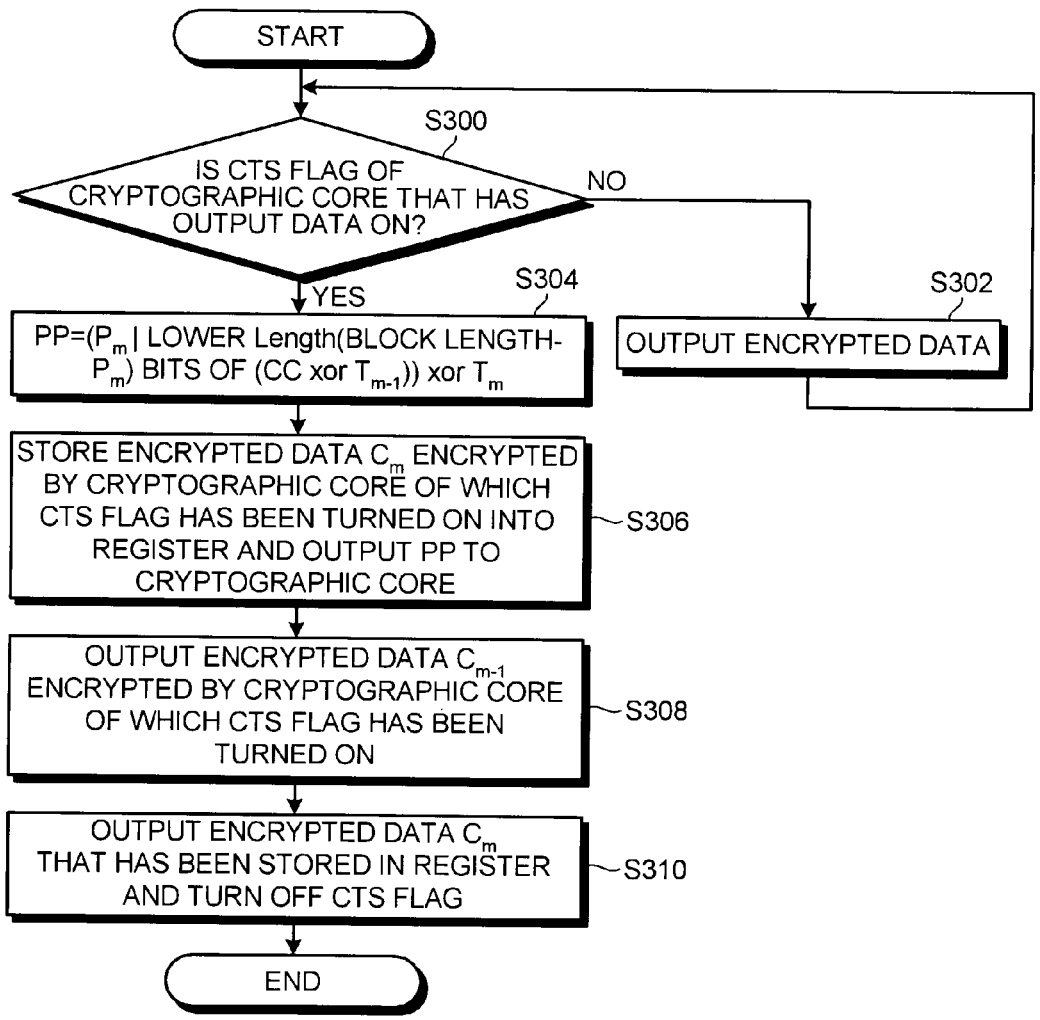
FIG. 6 is a flowchart of examples of an output controlling process and a concatenating process according to the embodiment.

FIG. 6 is a flowchart of examples of procedures in an output controlling process performed by the output controlling unit 37 and a concatenating process performed by the concatenating unit 33 according to the present embodiment.

First, when the encrypted data $C_j$ resulting from the operation performed on the input data $P_j$ ($0 \le j \le m-2$) is input to the cryptographic controlling unit 30 from one of the cryptographic cores 20 of which the CTS flag is turned off (step S300: No), the output controlling unit 37 controls the selector 31 so that the encrypted data $C_j$ that is input is output to the selector 35 and is output through the output data signal line 43 (step S302). The process then returns to step S300.

On the contrary, when the encrypted value CC, which is operation data that is generated during an operation process performed on the input data $P_{m-1}$, is input to the cryptographic controlling unit 30 from the cryptographic core 20-2 of which the CTS flag is turned on (step S300: Yes), the output controlling unit 37 controls the selector 31 so that the encrypted value CC that is input is output to the concatenating unit 33, and also, the output controlling unit 37 causes the next block of input data $P_m$ that is stored in the register 32 to be output to the concatenating unit 33. After that, the concatenating unit 33 concatenates the next block of input data $P_m$ with such a portion of the exclusive logical sum between the encrypted value CC and the mask value $T_{m-1}$ that has a data length obtained by subtracting the data length of the next block of input data $P_m$ from the block length. Further, the concatenating unit 33 calculates an exclusive logical sum PP between the data resulting from the concatenating process and the mask value $T_m$ (step S304). In this situation, the mask value $T_m$ is calculated by using Expression (5) shown below.

$$T_m = T_m \times \alpha^m \tag{5}$$

Subsequently, the output controlling unit 37 outputs the exclusive logical sum PP that is calculated by the concatenating unit 33 to the cryptographic core 20-2 of which the CTS flag is turned on. Also, when the encrypted data $C_m$ resulting from the operation performed on the input data $P_{m-1}$ is input to the cryptographic controlling unit 30 from the cryptographic core 20-2, the output controlling unit 37 controls the selector 31 so that the encrypted data $C_m$ that is input is output to the register 32 and is stored therein (step S306).

After that, when encrypted data $C_{m-1}$ resulting from the operation performed on the exclusive logical sum PP (the next block of input data $P_m$) is input to the cryptographic controlling unit 30 from the cryptographic core 20-2 of which the CTS flag is turned on, the output controlling unit 37 controls the selector 31 so that the encrypted data $C_{m-1}$ that is input is output to the selector 35 and is output through the output data signal line 43 (step S308).

Subsequently, the output controlling unit 37 outputs the encrypted data $C_m$ that is stored in the register 32 to the selector 35 and causes the encrypted data $C_m$ to be output through the output data signal line 43. After that, the output controlling unit 37 turns off the CTS flag of the cryptographic core 20-2 (step S310).

Figure 7:
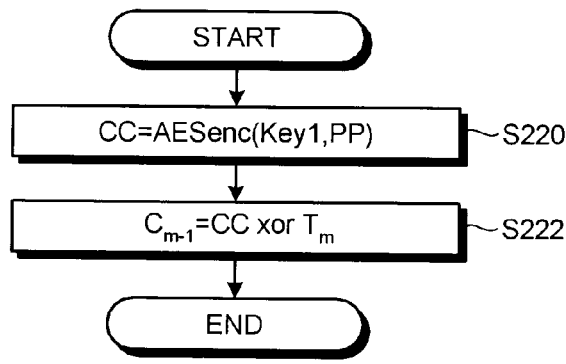
FIG. 7 is a flowchart of an example of a latter stage operation using the symmetric key cipher algorithm that utilizes CTS according to the embodiment.

FIG. 7 is a flowchart of an example of a procedure in the latter stage operation using the symmetric key cipher algorithm that utilizes CTS and is performed by the cryptographic core 20-2 according to the present embodiment. The process shown in FIG. 7 is performed after the process at step S306, before the process at step S308 shown in FIG. 6.

First, the cryptographic core 20-2 assigns the exclusive logical sum PP that is input thereto from the cryptographic controlling unit 30 and the symmetric key Key1 to Expression (3) above so as to calculate the encrypted value CC (step S220).

Subsequently, the cryptographic core 20-2 calculates the encrypted data $C_{m-1}$, which is an exclusive logical sum between the encrypted value CC that is calculated and the mask value $T_m$, and outputs the calculated encrypted data $C_{m-1}$ to the cryptographic controlling unit 30 (step S222). After that, the output controlling unit 37 ends the process.

When the interface unit 60 has received a new write request from the host apparatus 2, a new block of input data is input through the input data signal line 42 and, as a result, an assigning process by the assigning unit 36 is resumed. Accordingly, the output controlling unit 37 also resumes the process from step S300.

Figure 8:
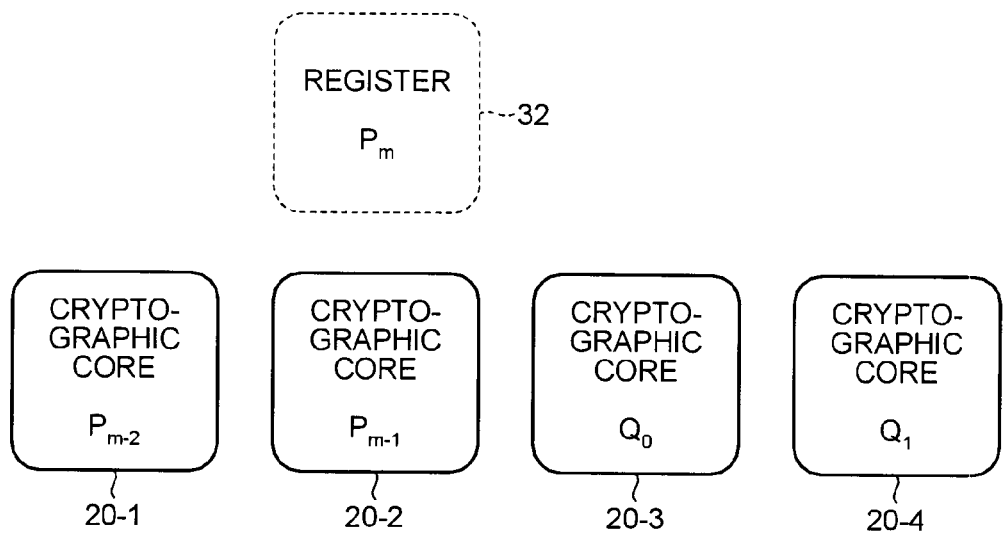
FIG. 8 is a diagram of an example in which blocks of input data are assigned to cryptographic cores and a register according to the embodiment.
Figure 9:
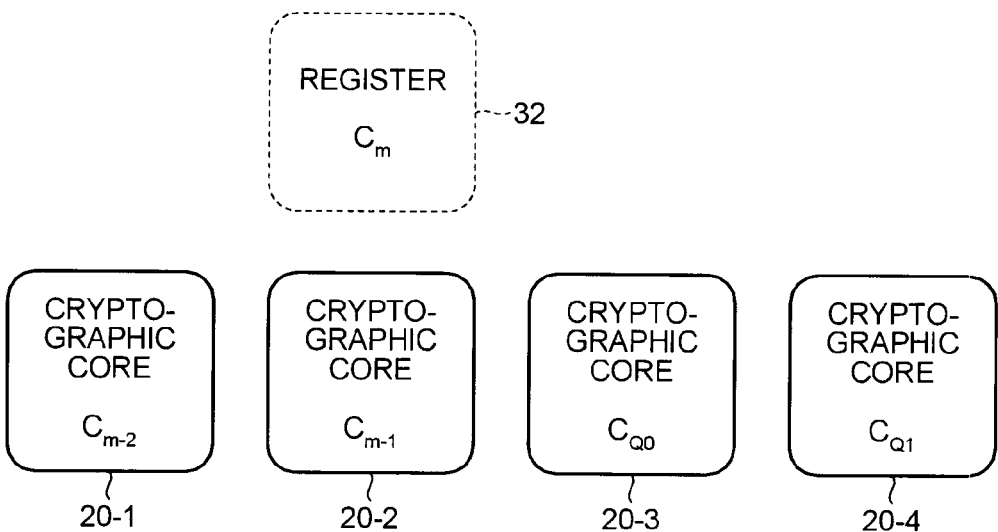
FIG. 9 is a diagram of an example in which blocks of encrypted data are output from the cryptographic cores and the register according to the embodiment.

FIG. 8 is a diagram of examples of the blocks of input data $P_j$ that are assigned to the cryptographic cores 20-1 to 20-4 and the register 32, as a result of the assigning process performed by the assigning unit 36. FIG. 9 is a diagram of examples of the blocks of encrypted data $C_j$ that are output from the cryptographic cores 20-1 to 20-4 and the register 32, as a result of the output control exercised by the output controlling unit 37.

In the example shown in FIG. 8, as a result of the assigning process shown in FIG. 3 that is performed by the assigning unit 36, input data $P_{m-2}$, input data input data $P_m$, input data $Q_o$, and input data $Q_1$ are assigned to the cryptographic core 20-1, the cryptographic core 20-2, the register 32, the cryptographic core 20-3, and the cryptographic core 20-4, respectively, in the stated order.

Further, as a result of the output control shown in FIG. 7 that is performed by the output controlling unit 37, as shown in FIG. 9, encrypted data $C_{m-2}$ derived from the input data $P_{m-2}$, encrypted data $C_{m-1}$ derived from the input data $P_m$, encrypted data $C_m$ derived from the input data $P_{m-1}$, encrypted data $C_{Q0}$ derived from the input data $Q_0$, and encrypted data $C_{Q1}$ derived from the input data $Q_1$ are output from the cryptographic core 20-1, the cryptographic core 20-2, the register 32, the cryptographic core 20-3, and the cryptographic core 20-4, respectively, in the stated order.

As described here, the cryptographic apparatus 10 according to the present embodiment is consisted that the operations that are performed on the input data $P_{m-1}$ and the input data $P_m$ in which a dependency relationship arises due to CTS are performed by employing the cryptographic core 20-2, the register 32, and the concatenating unit 33. In other words, the cryptographic apparatus 10 according to the present embodiment is configured so that the operations that are performed on the input data $P_{m-1}$ and the input data P, in which the dependency relationship arises are performed by the single cryptographic core while using the register 32 and the concatenating unit 33, instead of using a plurality of cryptographic cores. As a result, when the cryptographic apparatus 10 according to the present embodiment is used, even when the operations using CTS are performed, it is possible to perform the encryption processes in parallel without causing any of the cryptographic cores to be in a waiting state. Consequently, the speed of the encryption processes can be increased.

Further, the cryptographic apparatus 10 according to the present embodiment is able to output the blocks of encrypted data $C_j$ in the order in which the corresponding blocks of input data $P_j$ are input. As a result, it is possible to simplify the output control exercised over the blocks of encrypted data $C_j$.

Figure 10:
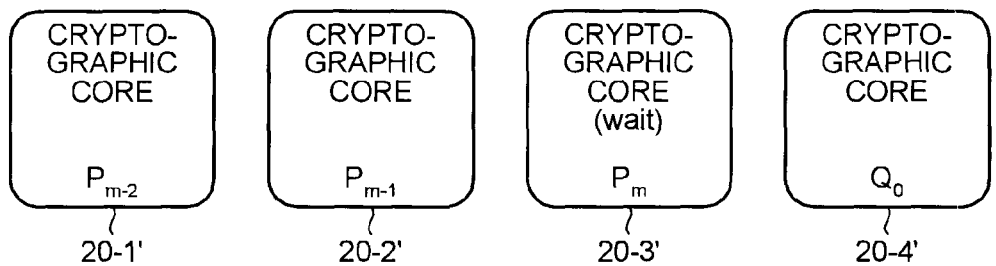
FIG. 10 is a diagram of a comparison example in which blocks of input data are assigned to cryptographic cores.
Figure 11:
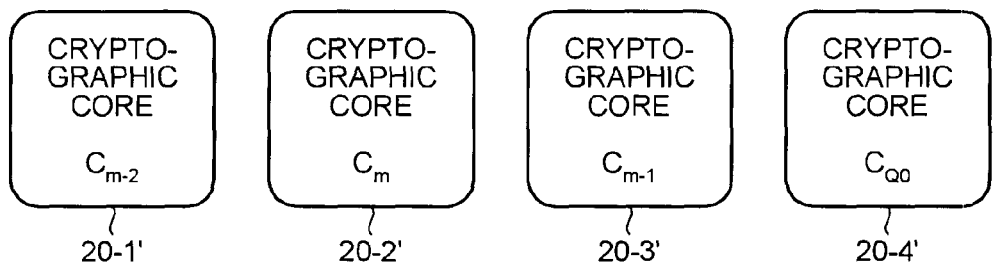
FIG. 11 is a diagram of a comparison example in which blocks of encrypted data are output from the cryptographic cores.

Next, as comparison examples, examples in which, without using the cryptographic apparatus 10 according to the present embodiment, the blocks of input data $P_j$ are assigned to cryptographic cores 20-1' to 20-4' so that blocks of encrypted data $C_j$ are output are shown in FIGS. 10 and 11.

In the example shown in FIG. 10, the input data $P_{m-2}$, the input data $P_{m-1}$, the input data $P_m$, and the input data $Q_0$ are assigned to the cryptographic core 20-1', the cryptographic core 20-2', the cryptographic core 20-3', and the cryptographic core 20-4', respectively, in the stated order. In this situation, the cryptographic core 20-3' executes an encryption process on the input data $P_m$ by using the encrypted value CC generated during an operation process performed by the cryptographic core 20-2'. Thus, the cryptographic core 20-3' is in a waiting state until the encrypted value CC is generated by the cryptographic core 20-2', and it is therefore not possible to have the processes performed in parallel.

Further, as shown in FIG. 11, the encrypted data $C_{m-2}$ derived from the input data $P_{m-2}$, the encrypted data $C_m$ derived from the input data $P_{m-1}$, the encrypted data $C_{m-1}$ derived from the input data $P_m$, and the encrypted data $C_{Qj}$ derived from the input data $Q_o$, are output from the cryptographic core 20-1', the cryptographic core 20-2', the cryptographic core 20-3', and the cryptographic core 20-4', respectively, in the stated order. In this situation, the encrypted data $C_m$ and the encrypted data are not output in the order in which the corresponding blocks of input data (i.e., the input data $P_{m-1}$ and the input data $P_m$) are input. As a result, the output control exercised over the blocks of encrypted data $C_j$ is complicated.

As explained above, according to the present embodiment, it is possible to increase the performance of encryption.

In the exemplary embodiment described above, the example is explained in which the cryptographic apparatus is applied to the memory system that is configured with, for example, a NAND semiconductor memory device; however, it is acceptable to apply the cryptographic apparatus to a magnetic disk device or the like. In other words, the storing method used by the storage device to which the cryptographic apparatus described in the exemplary embodiment is applied is not limited to any particular storing method.

Further, the exemplary embodiment described above is explained while using the cryptographic as the examples; however, it is possible to apply the same method to decryption processes as well.

While certain embodiments are described, these embodiments are presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryptographic apparatus, comprising:
a plurality of cryptographic processing circuits, each of which includes a flag storage unit that stores therein a CipherText Stealing (CTS) flag indicating whether an encryption that utilizes CTS is to be performed, and each of which operates in a same predetermined block cipher mode of operation and performs, when the CTS flag thereof is turned on, a complete encryption using a symmetric key cipher algorithm that utilizes CTS, while using a symmetric key;
an assigning unit configured to receive an input of a CTS signal indicating that second input data, that is input immediately after first input data having a block length, is shorter than the block length, to assign the first input data to one of the plurality of cryptographic processing circuits and to turn on the CTS flag of the one of the cryptographic processing circuits to which the first input data is assigned;

a concatenating unit that generates concatenated data by concatenating operation data generated during encrypting the first input data at the one of the cryptographic processing circuits and the second input data;

an output controlling unit that controls outputting the concatenated data to the one of the cryptographic processing circuits at which the first input data was encrypted, controls outputting first encrypted data obtained by encrypting the concatenated data at the one of the cryptographic processing circuits, and controls outputting second encrypted data obtained by encrypting the first input data at the one of the cryptographic processing circuits, and turns off the CTS flag of the one of the cryptographic processing circuits; and a single register that stores the second input data while the one of the cryptographic processing circuits, operating in the predetermined block cipher mode, completely encrypts the first input data, wherein the single register stores the second encrypted data while the one of the cryptographic processing circuits, operating in the predetermined block cipher mode, completely encrypts the concatenated data.

2. The apparatus according to claim 1, wherein the assigning unit stores the second input data into the single register, the one of the cryptographic processing circuits encrypts using the symmetric key cipher algorithm that utilizes CTS on the first input data so as to generate the operation data and the second encrypted data, the output controlling unit controls outputting the operation data and the second input data stored in the register to the concatenating unit, and the one of the cryptographic processing circuits encrypts using the symmetric key cipher algorithm that utilizes CTS on the concatenated data so as to generate the first encrypted data.

3. The apparatus according to claim 2, wherein the output controlling unit stores the second encrypted data into the single register from which the second input data is output and, after controlling outputting the first encrypted data, the output controlling unit controls outputting the second encrypted data stored in the single register.

4. The apparatus according to claim 1, wherein the assigning unit outputs a data length of the second input data to the concatenating unit, and the concatenating unit concatenates the operation data with the second input data according to the data length.

5. A memory system, comprising:

a plurality of cryptographic processing circuits, each of which includes a flag storage unit that stores therein a CipherText Stealing (CTS) flag indicating whether an encryption that utilizes CTS is to be performed, and each of which operates in a same predetermined block cipher mode of operation and performs, when the CTS flag thereof is turned on, a complete encryption using a symmetric key cipher algorithm that utilizes CTS, while using a symmetric key;

an assigning unit configured to receive an input of a CTS signal indicating that second input data, that is input immediately after first input data having a block length, is shorter than the block length, to assign the first input data to one of the plurality of cryptographic processing circuits and to turn on the CTS flag of the one of the cryptographic processing circuits to which the first input data is assigned;

a concatenating unit that generates concatenated data by concatenating operation data generated during encrypting the first input data at the one of the cryptographic processing circuits and the second input data;

an output controlling unit that controls outputting the concatenated data to the one of the cryptographic processing circuits at which the first input data was encrypted, controls outputting first encrypted data obtained by encrypting the concatenated data at the one of the cryptographic processing circuits, and controls outputting second encrypted data obtained by encrypting the first input data at the one of the cryptographic processing circuits, and turns off the CTS flag of the one of the cryptographic processing circuits; and a single register that stores the second input data while the one of the cryptographic processing circuits, operating in the predetermined block cipher mode, completely encrypts the first input data, wherein the single register stores the second encrypted data while the one of the cryptographic processing circuits, operating in the predetermined block cipher mode, completely encrypts the concatenated data; and a memory that stores therein encrypted data that is output from the one of the cryptographic processing circuits.

* * * * *